United States Patent [19]

Gaillard

[11] Patent Number: 5,682,454
[45] Date of Patent: Oct. 28, 1997

[54] OPTICAL-FIBER CABLE

[75] Inventor: Pierre Gaillard, Cergy, France

[73] Assignee: Alcatel Cable, Clichy Cedex, France

[21] Appl. No.: 560,691

[22] Filed: Nov. 20, 1995

[30] Foreign Application Priority Data

Nov. 21, 1994 [FR] France ............... 94 13901

[51] Int. Cl.$^6$ ............................................. G02B 6/44
[52] U.S. Cl. ................ 385/114; 174/72 TR; 174/117 R; 174/117 F; 264/1.28
[58] Field of Search ................................. 264/1.1, 1.24, 264/1.28, 1.29, 2.7, 339; 174/72 TR, 117 F, 117 FF, 117 A, 117 R; 385/114

[56] References Cited

U.S. PATENT DOCUMENTS

| | | |
|---|---|---|
| 4,709,983 | 12/1987 | Plessner et al. |
| 4,952,020 | 8/1990 | Huber. |
| 5,342,991 | 8/1994 | Xu et al. ............... 174/117 F |

FOREIGN PATENT DOCUMENTS

| | | |
|---|---|---|
| 0019026A1 | 11/1980 | European Pat. Off. . |
| 97414 | 1/1984 | European Pat. Off. ............ 174/117 F |
| 0194891A1 | 9/1986 | European Pat. Off. . |
| 0357139A3 | 7/1991 | European Pat. Off. . |
| 19912 | 2/1977 | France . |
| 2693560A1 | 1/1994 | France . |

Primary Examiner—Mathieu D. Vargot
Attorney, Agent, or Firm—Sughrue, Mion, Zinn, Macpeak & Seas, PLLC

[57] ABSTRACT

The present invention concerns an optical-fiber cable containing at least one optical-fiber module including a plurality of optical fibers assembled and held together by a flexible resin so as to define a ribbon, the ribbon inside the cable being rolled up so that its longitudinal edges substantially touch each other, and so that it is substantially cylindrical in shape, wherein the flexible resin is applied asymmetrically relative to the midplane of the ribbon in the unrolled state, which midplane contains all of the longitudinal axes of the fibers, and wherein the ribbon is rolled up by bringing its longitudinal edges together so that the majority of the resin is located inside the convex volume defined, when the ribbon is in the rolled-up state, by the surface that contains all of the longitudinal axes of the fibers.

3 Claims, 2 Drawing Sheets

OPTICAL-FIBER CABLE

The present invention relates to an optical-fiber cable, as well as to an optical-fiber module contained by such a cable.

BACKGROUND OF THE INVENTION

In general, an optical-fiber cable having optical-fiber modules contains one or more modules of assembled-together fibers. Such modules are preferably cylindrical in geometrical shape, in particular for reasons of compactness and ease of assembly. Unfortunately, a cylindrical geometrical shape is not the most suitable shape for overcoming problems encountered in connecting the modules to one or more sets of optical fibers disposed in layers inside a ribbon of optical fibers.

In order to solve both the above-mentioned connection problems and also the above-mentioned problems of compactness and ease of assembly, Document FR-2 693 560 proposes to implement an optical-fiber cable containing a central rod around which the optical fibers are distributed, the resulting assembly being surrounded by a holding sheath made of a synthetic material, and being such that the fibers are assembled and held together by a flexible resin so as to define a ribbon which is rolled up around the rod so that the longitudinal edges of the ribbon touch each other. After removing the sheath from the cable, a ribbon of optical fibers is available for connection to another ribbon in conventional manner.

However, that cable leaves a certain number of problems unsolved.

Firstly, since the ribbon is rolled up, the resin holding the optical fibers together is subjected to traction stresses tending to cause it to come away from the optical fibers. The optical fibers are then no longer held together or protected in the cable, so that they are much more sensitive to any external disturbances which give rise to a reduction in their transmission performance levels.

Secondly, the cable requires a central rod to be used to make it possible to maintain the rolled-up ribbon in a substantially cylindrical shape. Such a rod makes manufacture of the cable complex, and increases its overall size and its cost.

OBJECTS AND SUMMARY OF THE INVENTION

An object of the present invention is to remedy those problems by providing an optical-fiber cable of the type described in the above-mentioned document, but in which the risks of the resin coming away from the optical fibers are considerably reduced, and which does not require a strength member to be used.

To these ends, the present invention provides an optical-fiber cable containing at least one optical-fiber module comprising a plurality of optical fibers assembled and held together by a flexible resin so as to define a ribbon, said ribbon inside said cable being rolled up so that its longitudinal edges substantially touch each other, and so that it is substantially cylindrical in shape;

wherein said flexible resin is applied asymmetrically relative to the midplane of said ribbon in the unrolled state, which midplane contains all of the longitudinal axes of said fibers, and wherein said ribbon is rolled up by bringing its longitudinal edges together so that the majority of said resin is located inside the convex volume defined, when the ribbon is in the rolled-up state, by the surface that contains all of the longitudinal axes of the fibers.

By disposing the resin asymmetrically relative to the midplane of the ribbon, and by appropriately choosing the rolling direction, the resin in the rolled-up ribbon is subjected to compression stresses only, and this significantly limits the risks of the resin coming away.

Moreover, the chosen rolling direction causes the resin to be concentrated inside the rolled-up ribbon, thereby providing the resulting module with improved crushing strength.

The asymmetric disposition and the chosen rolling direction also facilitate rolling up the ribbon and maintaining its cylindrical shape, because the reaction forces of the resin reacting against the rolling are smaller than those encountered when the resin is disposed symmetrically. Furthermore, the resin that is located inside the rolled-up ribbon serves in part to provide mechanical strength, thereby making it possible to avoid the use of an additional strength member.

Advantageously, the ribbon in the rolled-up state may be twisted helically about its longitudinal axis. This makes it possible both to maintain the cylindrical shape of the ribbon better than the solution of the prior art in which the ribbon is rolled up longitudinally around a strength member, and also to provide the ribbon in the rolled-up state with improved resistance to the bending forces to which the cable is subjected.

In addition, since the cylindrical shape is better maintained, it is unnecessary to use a sheath made of a synthetic material disposed around the rolled-up ribbon, as recommended in the prior art, thereby further reducing both the overall size of the cable of the invention and also the manufacturing difficulties.

According to an additional characteristic, the resin has a modulus of elasticity that is less than 12,000 psi, thereby enabling it to be flexible enough to be subjected to the necessary rolling without deteriorating, and a coefficient of thermal expansion that is in the vicinity of that of the optical fibers, so that, under the effect of temperature variations, it does not subject the optical fibers to stresses that are too large and that might cause their optical properties to deteriorate.

The present invention also provides a method of manufacturing an optical-fiber module of a cable of the invention, said method including the following steps:

applying said flexible resin to the entire set of said fibers which are disposed parallel to one another so that their longitudinal axes lie in substantially the same plane, said flexible resin being applied asymmetrically relative to said plane;

partially cross-linking said resin so as to obtain said ribbon;

rolling up said ribbon by bringing together its longitudinal edges, so as to give it a shape that is substantially cylindrical; and fully cross-linking said resin so as to maintain the cylindrical shape of the rolled-up ribbon.

By sub-dividing cross-linking of the resin into two steps, it is possible both to facilitate the rolling operation, since the resin is not fully set during this operation, and is therefore more flexible and easier to roll, and also to facilitate maintaining the rolled-up ribbon in a properly cylindrical shape in the cable, by finishing setting after the ribbon has been rolled up.

BRIEF DESCRIPTION OF THE DRAWINGS

Other characteristics and advantages of the present invention appear from the following description of a cable of the invention and of an associated manufacturing method, given by way of non-limiting example and with reference to the accompanying drawings, in which.

In all of the figures, common elements are given like references.

MORE DETAILED DESCRIPTION

Figure 1:
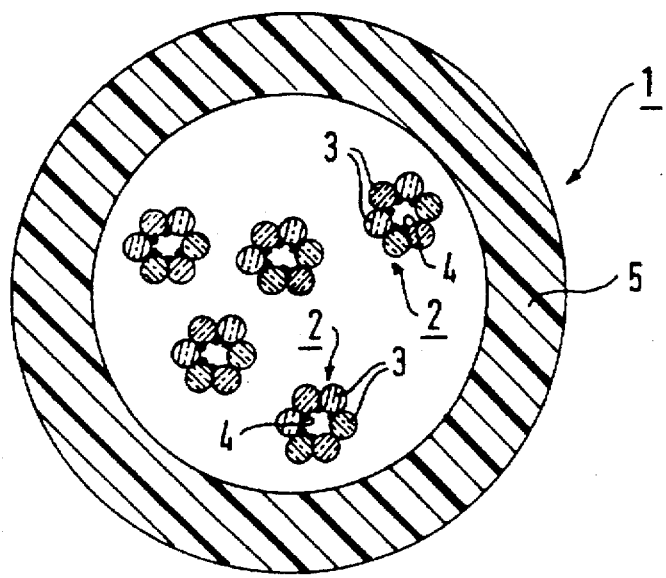
FIG. 1 is a cross-section through a cable of the invention.

FIG. 1 shows a cable 1 of the invention containing a plurality of optical-fiber modules 2 (five modules 2 are shown in FIG. 1). According to the invention, each optical-fiber module 2 comprises a plurality of optical fibers 3 (six in the example shown) assembled and held together by means of a flexible resin 4 (e.g. having a modulus of elasticity that is less than 12,000 psi), preferably having a coefficient of thermal expansion that is in the vicinity of that of the optical fibers 3. The optical-fiber modules 2 are disposed loosely inside a protective jacket 5 of the cable 1, the jacket being made of an insulating material.

Figure 2A:
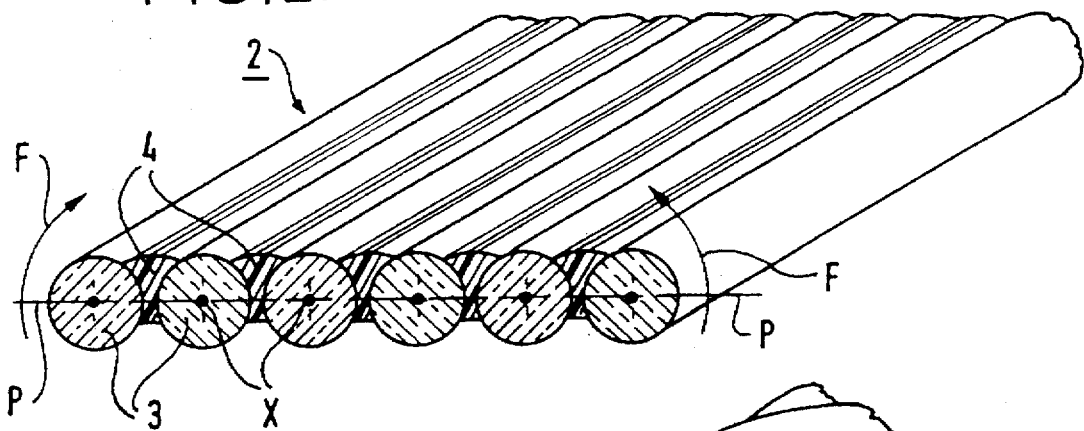
FIG. 2A is an enlarged perspective view of an optical-fiber module of the cable shown in FIG. 1, the module being in the unrolled state.

FIG. 2A shows a module 2 in the unrolled state. In this state, the module 2 is in the form of a ribbon of optical fibers, the ribbon also being referenced 2. According to the invention, in order to facilitate rolling the ribbon 2 while making it unnecessary to use a strength member, and in order to prevent the resin 4 from coming away from the optical fibers 3 once the ribbon 2 is in the rolled-up state, the resin 4 is applied to the fibers 3 asymmetrically relative to the midplane P of the ribbon 2.

More precisely, in the unrolled module 2, all of the optical fibers 3 are disposed parallel to one another with their longitudinal axes X all lying in substantially the same plane which is referenced P in FIG. 2A.

Because of the asymmetrical disposition of the resin 4 relative to the plane P, it is easy to roll up the ribbon 2 so as to bring its longitudinal edges together as indicated by the arrows F, so that the majority, and preferably almost all, of the resin 4 is located "inside" the rolled-up ribbon, i.e. in the convex volume V delimited by the surface S (see FIG. 2B) which contains all of the longitudinal axes X of the fibers 3 in the ribbon 2 in the rolled-up state. In this way, a module 2 is obtained which is substantially cylindrical in shape (see FIG. 2B) and in which the resin 4 is subjected to compression stresses only, so that the risk of it coming away from the optical fibers 3 is very limited.

Figure 2B:
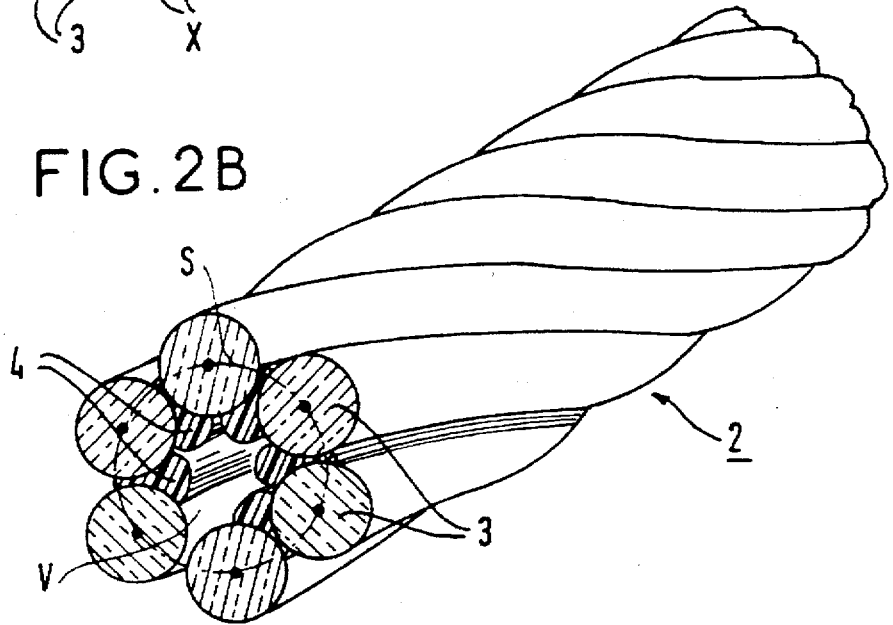
FIG. 2B is an enlarged perspective view of an optical-fiber module of the cable shown in FIG. 1, the module being in the rolled-up state.

FIG. 2B shows the module 2 in the rolled-up state. According to the invention, the module 2 may be rolled up longitudinally, i.e. so that its optical fibers 3 remain parallel to one another and to a common central axis.

Also according to the invention, the rolled-up module 2 may be twisted helically about its longitudinal axis, as shown in FIG. 2B. This offers the advantage of making the module 2 more flexible and more resistant to bending. Furthermore, such a helically-twisted rolled-up module retains its cylindrical shape better than a longitudinally rolled-up module, so that it is unnecessary to use a holding sheath disposed directly around the module 2 and in contact therewith, as recommended in the prior art.

In order to make a module 2 of a cable of the invention, it is merely necessary to make the ribbon that constitutes the module, i.e. to apply the resin 4 to the optical fibers 3 held parallel to one another and in substantially the same plane, and then to cross-link the resin and to roll up the ribbon so as to obtain the module 2 in the rolled-up state. Alternatively, cross-linking may be performed only after the rolling operation has been performed.

Figures 3, 4:
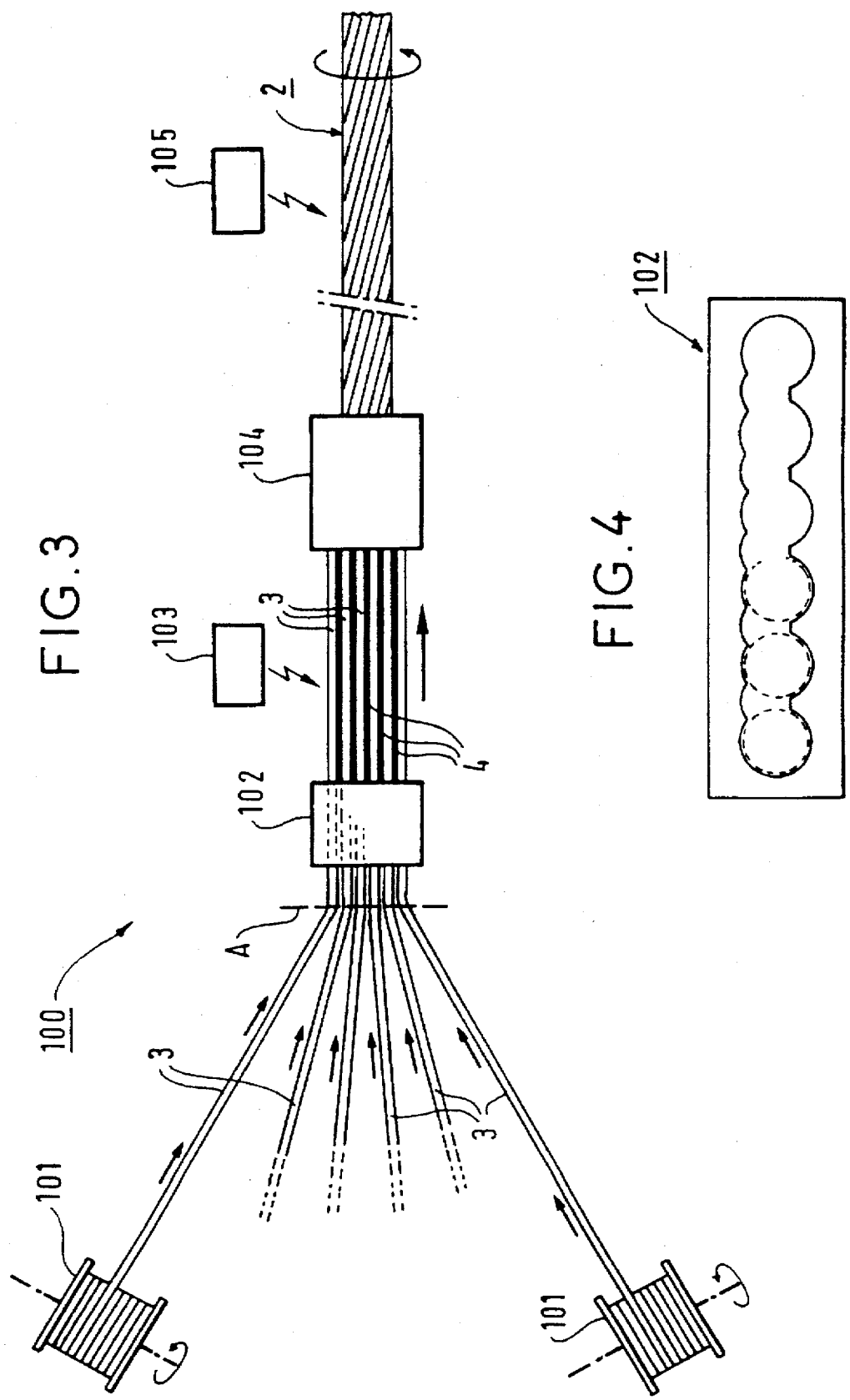
FIG. 3 is a diagrammatic view of apparatus for manufacturing an optical-fiber module of the cable shown in FIG. 1.
FIG. 4 is a cross-sectional view of the coating die 102 in FIG. 3.

FIG. 3 is a diagrammatic view of an apparatus 100 for manufacturing a module 2 such as the module shown in FIG. 2B, according to another variant of the invention.

The apparatus 100 includes a plurality of reels 101 (only two of them are shown in FIG. 3 for reasons of clarity) for storing and paying out the optical fibers 3 independently from one another. The optical fibers 3 are brought together so that they are parallel to one another and so that they lie in substantially the same plane P at a section A of the apparatus 100. They then pass through a coating die 102 enabling them to be coated with the resin 4 in the non cross-linked state. In order to apply the non cross-linked resin 4 asymmetrically relative to the plane P, it is possible to use a die 102 having a cross-section that is complementary to the cross-section to be taken up by the resin 4 (see FIG. 4).

All of the coated fibers 3 are then exposed to ultraviolet radiation so as to cross-link the resin 4 partially by means of a cross-linking oven 103, so that the resin 4 retains a certain amount of flexibility while already holding the optical fibers 3 together.

The resulting ribbon then passes through apparatus 104 for rolling it up and helically twisting it about its longitudinal axis so as to obtain a substantially cylindrical shape. It then goes past another oven 105 that is identical to oven 103 and that fully cross-links the resin 4, also by means of ultraviolet radiation, so as to maintain the cylindrical shape of the module 2.

By performing cross-linking in two steps, respectively before and after the rolling and twisting operation, the rolling and twisting operation is made easier, and the strength of the module 2 in the rolled-up state is improved.

The resulting module 2 may then be used in any type of optical cable.

Naturally, the present invention is not limited to the above-described embodiment.

In particular, an optical cable of the invention may be of arbitrary structure that is optionally different from the loose structure shown in FIG. 1. For example, a plurality of modules 2 may be assembled together around a central strength member, instead of being left loose inside a protective jacket.

The outer protective jacket of the cable may be simple, as shown in FIG. 1, or more complex, including various strength and/or waterproofing members, all such dispositions being well known to persons skilled in the art.

The ribbon 2 may be helically twisted around a holding tool that is removed once twisting is finished. For example, twisting may be performed by means of a rotating ribbon-receiving reel.

The resin used may be of any known type, provided that it is relatively flexible.

The manufacturing apparatus shown may be installed vertically or horizontally.

Finally, any means may be replaced with equivalent means without going beyond the ambit of the present invention.

I claim:

1. An optical-fiber cable containing at least one optical-fiber module comprising a plurality of optical fibers assembled and held together by a flexible resin so as to define a ribbon, said ribbon inside said cable being rolled up so that its longitudinal edges substantially touch each other, and so that it is substantially cylindrical in shape, wherein said flexible resin is applied asymmetrically relative to the midplane of said ribbon in the unrolled state, which midplane contains all of the longitudinal axes of said fibers, and wherein said ribbon is rolled up by bringing its longitudinal edges together so that the majority of said resin is located inside a convex volume defined, when the ribbon is in the rolled-up state, by the surface that contains all of the longitudinal axes of the fibers.

2. A cable according to claim 1, wherein said ribbon in the rolled-up state is twisted helically about its longitudinal axis.

3. A cable according to claim 1, wherein said resin has a modulus of elasticity that is less than 12,000 psi, and a coefficient of thermal expansion that is in the vicinity of that of the optical fibers.

* * * * *